United States Patent [19]
Nitardy

[11] Patent Number: 5,501,758
[45] Date of Patent: Mar. 26, 1996

[54] METHOD OF MAKING A COLLAPSIBLE PLASTIC CONTAINER

[75] Inventor: Larry E. Nitardy, Easton, Pa.

[73] Assignee: North America Packaging Corporation, Bala-Cynwyd, Pa.

[21] Appl. No.: 170,382

[22] Filed: Dec. 20, 1993

[51] Int. Cl.⁶ .......................... B29C 53/06; B32B 31/20; B65D 6/10; B65D 6/18
[52] U.S. Cl. .......................... 156/198; 156/207; 156/224; 156/226; 156/227; 229/930; 229/939; 220/666; 220/670; 220/DIG. 14; 264/177.1; 264/177.12; 264/295; 493/60
[58] Field of Search .......................... 156/207, 224, 156/227, 226, 209, 198; 493/60, 82, 160, 397; 229/939, 930; 220/666, 670, 673, DIG. 14; 264/295, 177.1, 177.12

[56] References Cited

U.S. PATENT DOCUMENTS

| | | |
|---|---|---|
| 3,240,845 | 3/1966 | Voelker . |
| 3,350,492 | 10/1967 | Grootenboer .......................... 264/296 |
| 3,542,618 | 11/1970 | De Vaughn . |
| 3,615,149 | 10/1971 | Malone et al. . |
| 3,615,964 | 10/1971 | Malone . |
| 3,664,783 | 5/1972 | Murray . |
| 3,757,559 | 9/1973 | Welsh . |
| 3,907,193 | 9/1975 | Heller .......................... 229/930 |
| 3,981,213 | 9/1976 | Lopman .......................... 493/60 |
| 4,100,239 | 7/1978 | Daniels, Jr. . |
| 4,172,749 | 10/1979 | Liggett . |
| 4,373,929 | 2/1983 | Smith .......................... 229/930 |
| 4,386,926 | 6/1983 | Heller .......................... 229/930 |
| 4,390,383 | 6/1983 | van Dongeren . |
| 4,482,417 | 11/1984 | Hulber et al. . |
| 4,515,648 | 5/1985 | Kolbe et al. . |
| 4,700,862 | 10/1987 | Carter et al. . |
| 4,948,039 | 8/1990 | Amatangelo . |
| 5,089,202 | 2/1992 | Lippold . |
| 5,114,034 | 5/1992 | Miller et al. .......................... 220/7 |
| 5,138,923 | 8/1992 | Kent et al. .......................... 493/60 |
| 5,178,245 | 1/1993 | Cox . |

FOREIGN PATENT DOCUMENTS

| | | |
|---|---|---|
| 1108600 | 4/1968 | United Kingdom . |
| 1108315 | 4/1968 | United Kingdom . |
| 1240514 | 7/1971 | United Kingdom . |
| 1298673 | 12/1972 | United Kingdom . |
| 94/02364 | 2/1994 | WIPO .......................... 229/939 |

*Primary Examiner*—Michele K. Yoder
*Attorney, Agent, or Firm*—Miller & Christenbury

[57] ABSTRACT

A reusable and collapsible container having a collapsed configuration for storage and shipment and an assembled configuration for containing a product. The container is formed from a polymeric sheet and has substantially flat panels, hinges connecting adjacent panels, and releasable fasteners on at least some of the panels for holding the panels in an assembled configuration. The sheet has opposing walls separated by longitudinally extending webs. A portion of the hinges cross the longitudinally extending webs and are formed by hot compression of at least one wall of the sheet. Another portion of the hinges are longitudinally extending and are formed by cold compression of at least one wall of the sheet.

10 Claims, 7 Drawing Sheets

5,501,758

METHOD OF MAKING A COLLAPSIBLE PLASTIC CONTAINER

BACKGROUND OF THE INVENTION

This invention relates to a reusable collapsible container for the shipment of products as well as a method and apparatus for making the container. The container collapses to a flat configuration for efficient shipment or storage. When assembled for the shipment or storage of products, the container is capable of withstanding forces associated with stacking and handling.

FIELD OF THE INVENTION

Box-type containers are important for the shipment of products as they travel along the chain of distribution from manufacturer to consumer. Such containers are also useful for product storage. Accordingly, there is always a need for inexpensive containers for these and other applications.

Ideally, box-type containers are structurally strong when assembled to withstand the forces associated with stacking as well as the wear and tear associated with handling. Boxes are also preferably collapsible into a flattened configuration for efficient storage and shipment. Such boxes are also preferably reusable to improve their cost effectiveness and recyclable to assuage environmental concerns and promote efficient use of raw materials. Box-type containers are preferably resistant to the dampness associated with storage facilities. The ideal reusable container would also be washable between each cycle of use.

Various types of cardboard boxes have been known or used for many years. Although such boxes are inexpensive to manufacture, their overall cost effectiveness is compromised by limited reuse and, in many cases, they are discarded after a single use. Cardboard boxes also deteriorate when exposed to moisture, thereby reducing their already questionable strength and integrity. Traditional cardboard boxes also require the use of tape, staples or other fasteners which must be applied by the box's user and removed and replaced between each use.

In U.S. Pat. No. 4,948,039, Amatangelo disclosed a collapsible container formed from double-walled plastic sheet. The Amatangelo box has panels separated by hinges formed by cutting through one of the sheet's walls. Such a hinge structure somewhat reduces the container's strength along the hinge. Also, such a hinge allows access for liquids between the sheet's walls and reduces the box's thermal insulation characteristics. Moreover, the cutting process leaves plastic shavings; and the step of trimming the shavings, if performed, is labor intensive and expensive.

In U.S. Pat. No. 5,114,034, Miller et al disclosed a tote container also formed from double-walled plastic sheet. The Miller box has panels connected by hinges formed by creating score lines in the double-walled sheet. At least some of the mechanically scored lines maintain a memory and resist the complete collapse of the container into a flat configuration, thereby increasing the required shipment and storage space. Also, scoring cannot form a sharp and straight hinge line.

Accordingly, there is a great and thus-far unsatisfied demand for an inexpensive collapsible container having a flat configuration when collapsed and high strength when assembled.

OBJECTS OF THE INVENTION

It is an object of the invention to provide a collapsible container that overcomes the problems associated with conventional collapsible containers.

It is another object of the invention to provide a container that is reusable and recyclable.

It is a further object of the invention to provide a collapsible container having hinged panels which lay flat in a collapsed configuration for efficient storage and shipment.

It is another object of the invention to provide a container having high strength when assembled to withstand handling during shipment and stacking during storage.

It is a further object of the invention to provide a container with panels having a double-wall construction for improved strength, moisture resistance or retention, and thermal insulation.

Another object of the invention is to provide an inexpensive and cost effective collapsible container.

It is a further object of this invention to provide a method for producing superior collapsible containers and for forming hinges in double-wall plastic sheet having reduced memory and high strength.

It is yet another object of the invention to provide an apparatus for inexpensively and efficiently forming collapsible containers.

Other objects of the invention will be apparent to one of skill in this art in view of the descriptions that follow.

SUMMARY OF THE INVENTION

This invention provides a reusable container collapsible into a flattened configuration for storage and shipment. The container is formed from plastic, double-walled sheet. The container's panels are joined by living hinges, some formed by hot compression and others formed by cold compression. Releasable fasteners are provided on the panels to maintain an assembled configuration.

This invention also provides a method for producing the collapsible container. The method includes creating the hinges, cutting a container blank, and applying fasteners to the container's panels.

An apparatus used in forming the collapsible container is also provided to perform the container forming method. The apparatus includes tools for creating hinges by hot compression, creating cold compressed hinges, releasing the container blank, and applying releasable fasteners.

The apparatus and method according to this invention provide an inexpensive and cost effective collapsible container adapted for multiple cycles of use.

DETAILED DESCRIPTION OF THE INVENTION

Figure 1:
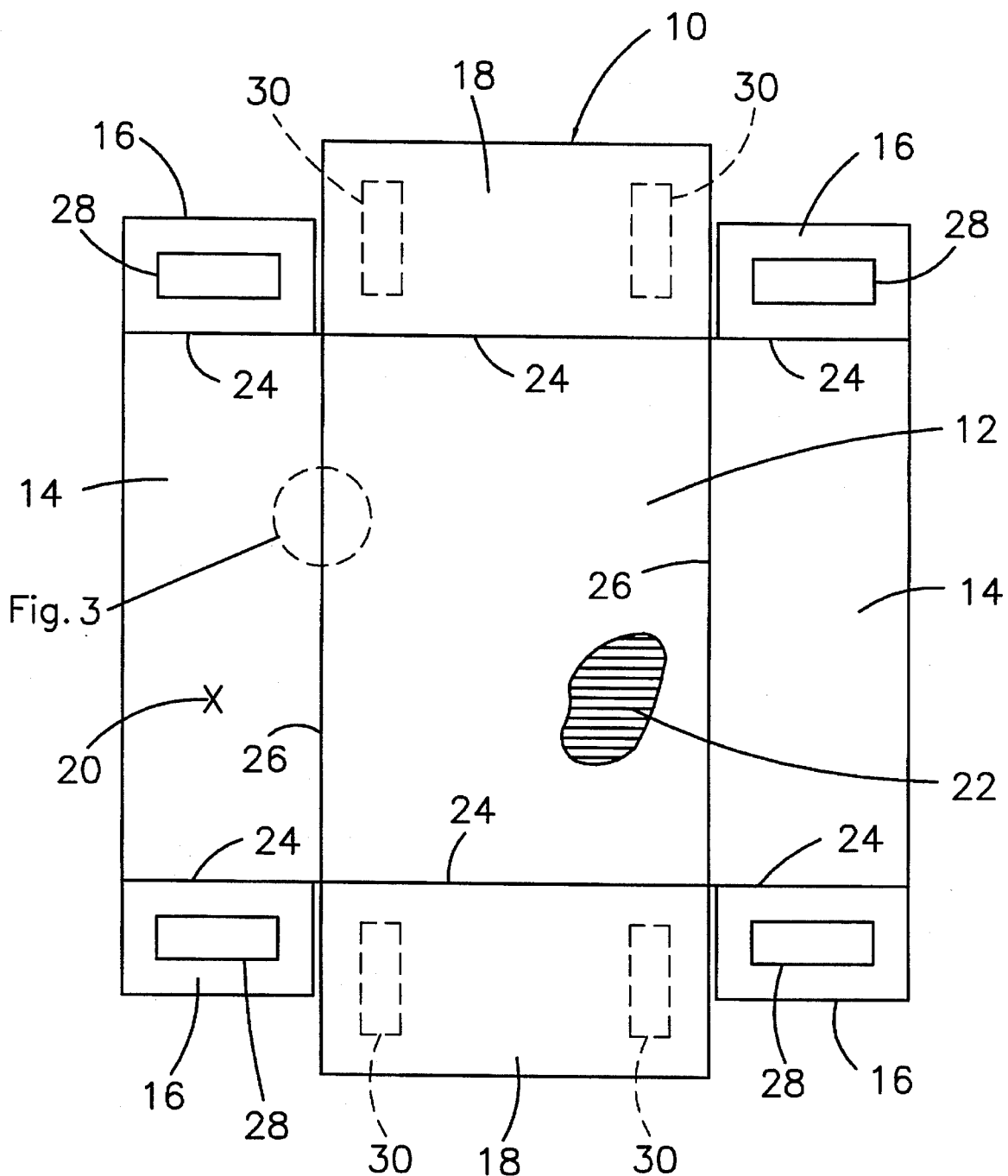
FIG. 1 is a top view of a collapsible container according to this invention in a collapsed configuration.

The following description is intended to refer to the specific embodiments of the invention illustrated in the drawings. This description is not intended to define or limit the scope of the invention, which is defined separately in the claims that follow.

Referring to FIG. 1, which shows a collapsible container 10 in a collapsed configuration, the container 10 has a bottom panel 12, two side panels 14, side panel flaps 16 at the edges of each side panel 14, and two end panels 18. Container 10 is formed from double-walled sheet 20, and the double-webs 22 which separate the walls of sheet 20 are shown via the cut-away portion of double-walled sheet 20. Hinges 24 and 26 separate adjacent container panels 12, 14 and 18 and flaps 16. Parallel hinge lines 24 are oriented substantially parallel to webs 22 in double-walled sheet 20. Transverse hinge lines 26 cross at least a portion of webs 22 at substantially right angles.

Releasable fasteners are applied to various container panels and flaps. Container 10, for example, utilizes a hook and loop fastener wherein hook components 28 are mounted on side panel flaps 16 and mating loop components 30 are mounted on end panels 18. When end panels 18 are folded upwardly along parallel hinge line 24, side panels 14 are folded upwardly along transverse hinge lines 26, and side panel flaps 16 are folded inwardly along parallel hinge lines 24, hook components 28 mate with loop components 30 to hold container 10 in an assembled configuration.

Figure 2:
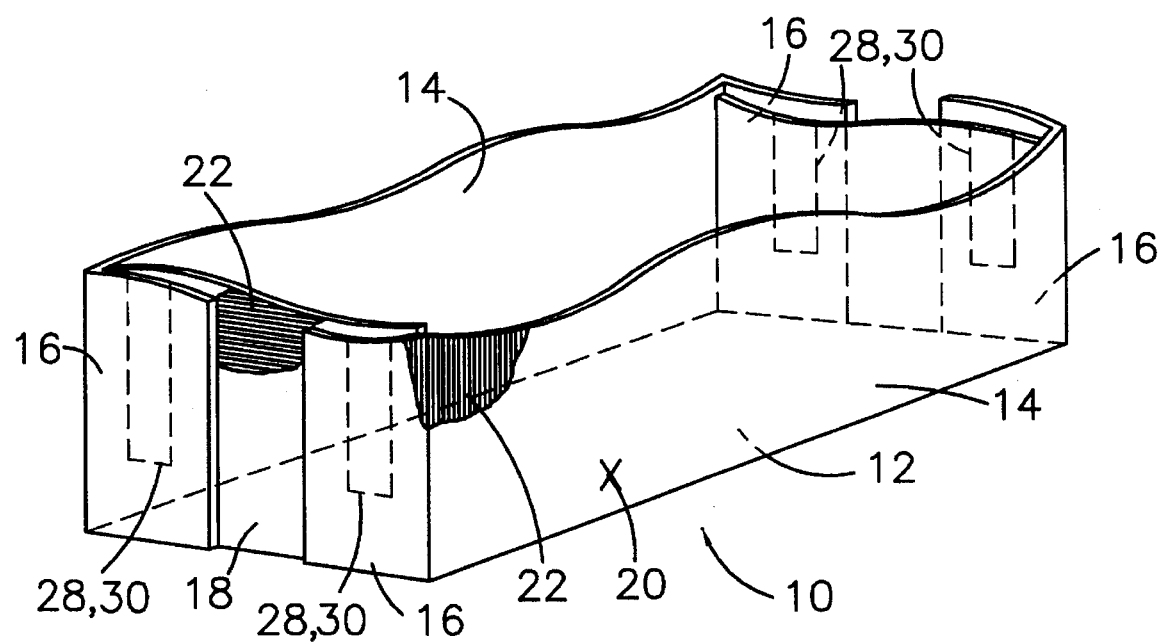
FIG. 2 is a perspective view of the bottom portion of the container shown in FIG. 1 in an assembled configuration.

FIG. 2 shows the bottom portion of container 10 in an assembled configuration. The cut-away portion of double-walled sheet 20 illustrates that webs 22 run vertically through assembled side panels 14 and side panel flaps 16. Webs 22 run horizontally through assembled end panels 18.

It is preferred for webs 22 to run vertically through side walls 14 which are longer than end walls 18. Vertically running webs provide improved strength to withstand stacking forces which expose side walls 14 of container 10 to compressive forces. A long side wall having webs that run horizontally could buckle at a weakened location between the parallel webs when exposed to compressive forces. Although webs 22 run horizontally through assembled end walls 18, side panel flaps 16, which have vertically running webs 22 and cover a substantial portion of end walls 18 provide the support necessary to withstand compressive forces. Accordingly, it is preferred that the longer side walls 14 and side panel flaps 16 have vertically running webs 22 in their assembled configuration so that side walls 14 have greater compressive strength and end walls 18 are reinforced by side panel flaps 16 along the shorter sides of the container.

It is also preferred that webs 22 run across the width of bottom panel 12 as shown in FIG. 1, and not lengthwise between end walls 18. This orientation of webs 22 strengthens bottom panel 12, thereby increasing the bottom panel's resistance to buckling.

Figure 3:
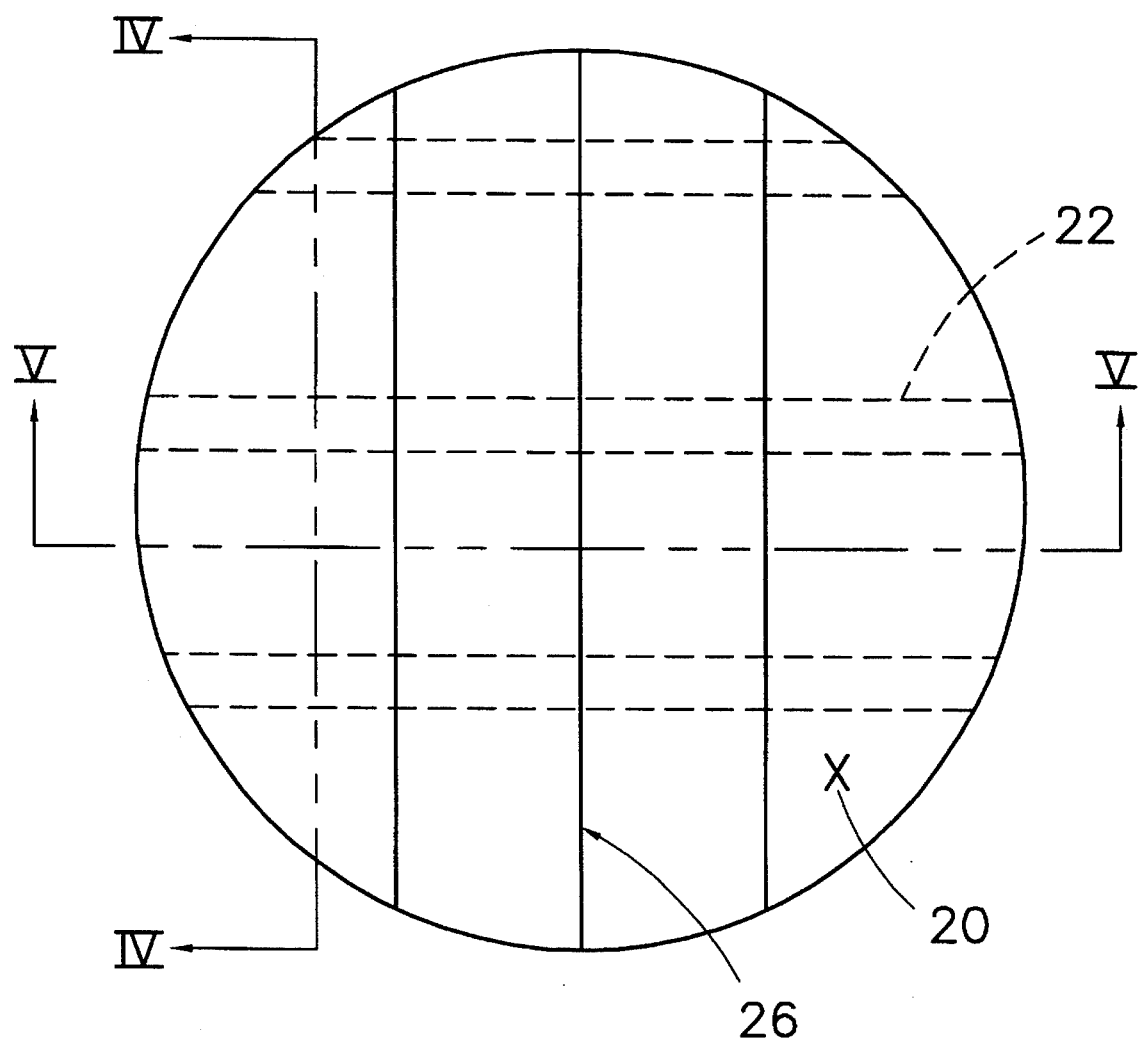
FIG. 3 is a top view of the detail of the container as indicated in FIG. 1.

FIG. 3 is an enlargement of the detail defined in FIG. 1, providing a top view of transverse hinge line 26. As shown in FIG. 3, transverse hinge line 26 crosses webs 22 at substantially right angles.

Figure 4A:
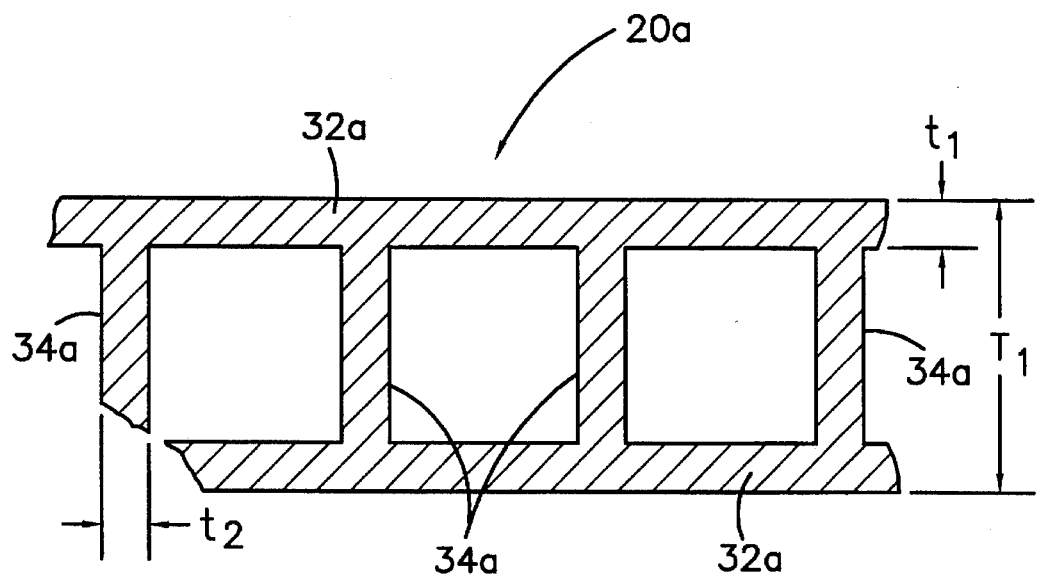
FIGS. 4a and 4b are cross-sectional side views of double-walled sheets along section A—A indicated in FIG. 3, illustrating webbed sheet construction (FIG. 4a) and corrugated sheet construction (FIG. 4b).
Figure 4B:
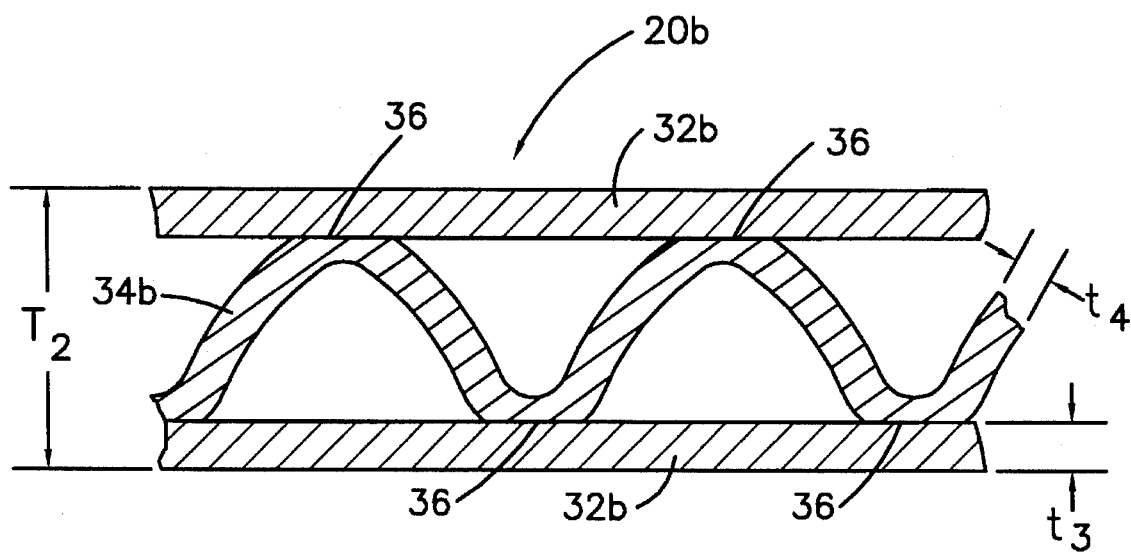

FIGS. 4a and 4b are examples of double-walled sheet constructions shown by cross sections taken along section A—A in FIG. 3. Either of these double-walled sheet constructions, or any other equivalent construction, is contemplated for use in container 10 shown in FIG. 1.

The double-walled sheet 20a shown in FIG. 4a has a webbed construction. A pair of opposing walls 32a are separated by webs 34a. Double-walled sheet 20a preferably has an overall thickness $T_1$ of approximately 2 mm to approximately 16 mm. Thickness $t_1$ of opposing walls 32a and thickness $t_2$ of webs 34a are selected according to the manufacturer's preference or customer specifications. Webs 34a are substantially perpendicular to opposing walls 32a. However, webs 34a can be at any angle, or any combination of angles, to opposing walls 32a. Webs 34a preferably have thickness $t_2$ equal to thickness $t_1$ of opposing walls 32a, but may have lesser or greater thickness depending upon the application and the manufacturer's preference. Double-walled sheet 20a is formed by extruding plastic material through a die to provide the desired profile. Such extrusion processes are well known in the art.

FIG. 4b shows a double-walled sheet 20b having a corrugated construction. Opposing walls 32b are separated by an undulating sheet 34b. Double-walled sheet 20b is formed by laminating undulating sheet 34b between two opposing walls 32b and creating bonds 36 between undulating sheet 34b and each opposing wall 32b. Bond 36 may be made by heat, adhesion, or any other manner known in the art. Double-walled sheet 20b preferably has an overall thickness $T_2$ of approximately 2 mm to approximately 16 mm. Thickness $t_3$ of opposing walls 32b and thickness h of undulating sheet 34b are selected according to the manufacturer's preference or customer specifications. Bond 36 between undulating sheet 34b and opposing walls 32b is preferably formed by a heat seal process or the application of an adhesive. Opposing walls 32b and undulating sheet 34b may be the same or different materials. It is preferred, however, to form a heat seal between adjacent sheets formed from the same material. Double-walled sheet 20b is optionally formed by extruding plastic material through a die to provide the desired profile.

Figure 5A:
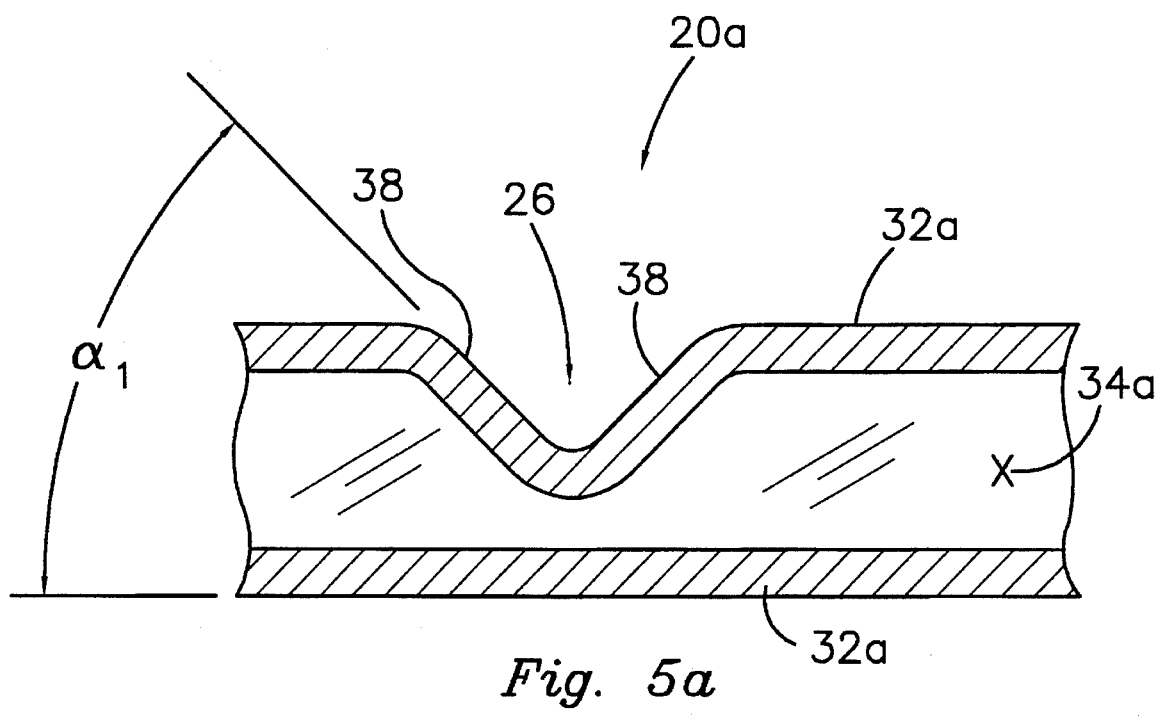
FIGS. 5a and 5b are cross-sectional side views of double-walled sheets along section B—B indicated in FIG. 3, illustrating a hinge in a flat configuration (FIG. 5a) and in a folded configuration (FIG. 5b).

FIG. 5a shows a cross-sectional side view of transverse hinge line 26 formed in double-walled sheet 20a. Transverse hinge line 26 has inclined surfaces 38 formed in one opposing wall 32a. Inclined surfaces 38 are preferably at an angle $\alpha_1$ of approximately 45° with respect to the surface of opposing wall 32a.

Multiple transverse hinge lines 26 may be formed opposite one another in opposing walls 32a. Such a configuration of transverse hinge lines 26 would allow bi-directional folding of panels.

Figure 5B:
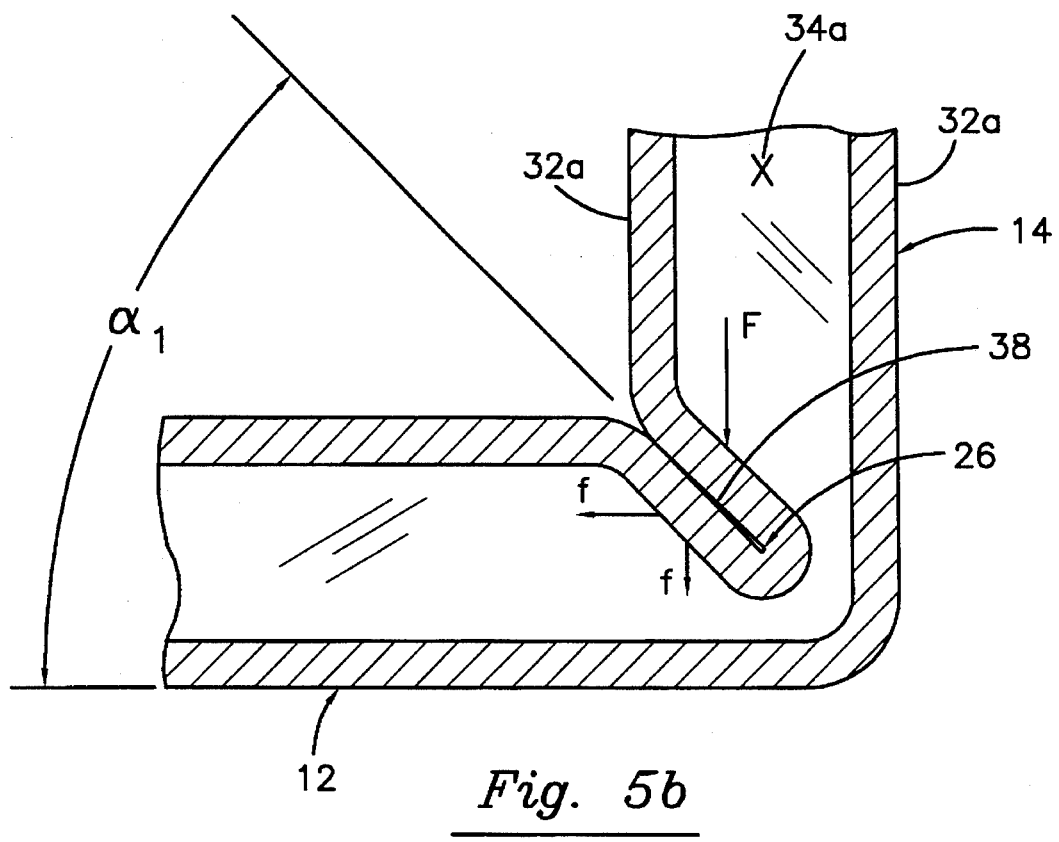

FIG. 5b shows transverse hinge line 26 in a folded configuration. Inclined surfaces 38 come together at angle $\alpha_1$, which is preferably about 45°. Contact between inclined surfaces 38 provides a benefit with respect to the compressive strength of the assembled container. In other words, downward compressive force F on side panels 14 will be distributed through inclined surfaces 38 to bottom panel 12 (see FIG. 1). Accordingly, horizontal and vertical components f of compressive force F will be partially distributed to bottom panel 12.

Figure 6:
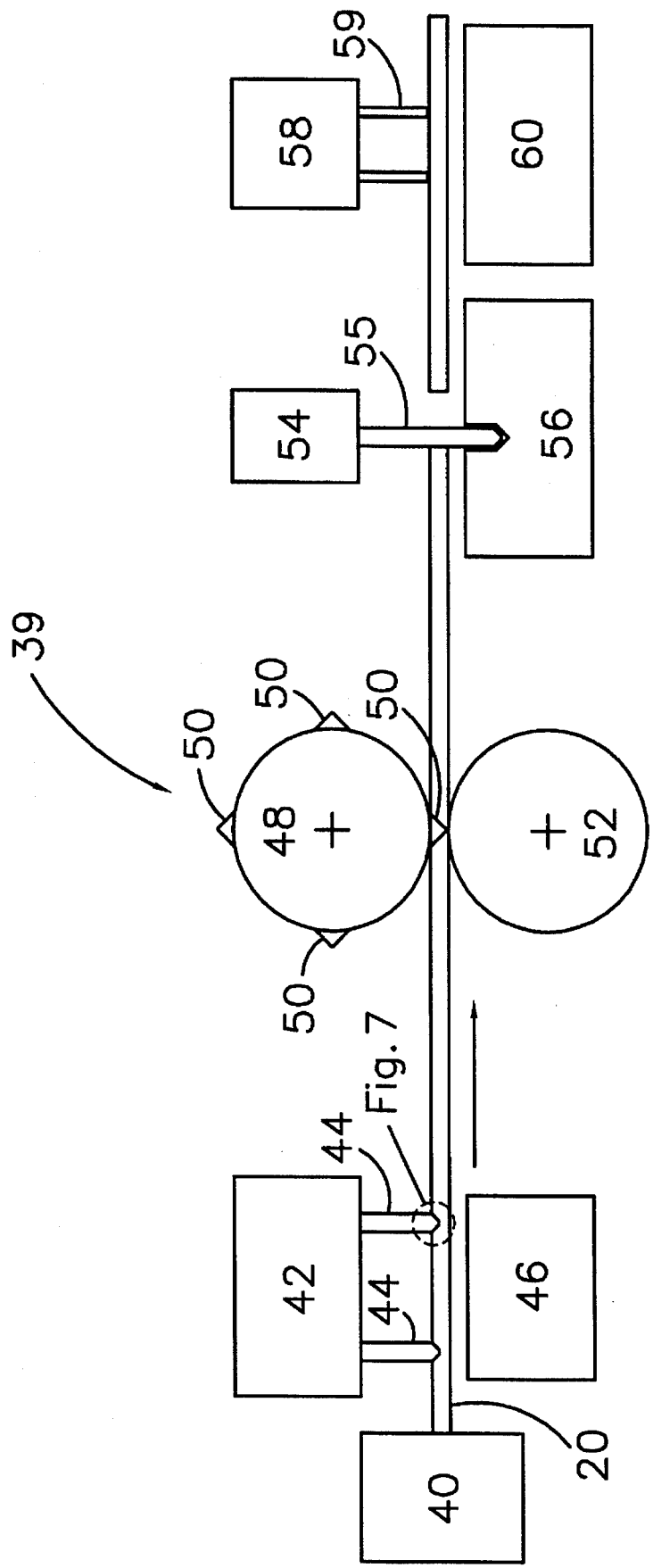
FIG. 6 is a schematic side view of an apparatus used to form a container according to this invention.

FIG. 6 illustrates an embodiment of the apparatus used to form a collapsible container according to this invention. Both the method and apparatus will now be described with reference to FIG. 6. The machine designated numeral 40 provides double-walled sheet 20. Machine 40 is optionally an extruder which continuously produces double-walled sheet 20a shown in FIG. 4a. Machine 40 may optionally be a device for laminating double-walled sheet 20b shown in FIG. 4b into a corrugated construction. Machine 40 may also optionally be any known device capable of delivering preformed double-wall sheet from a roll or in the form of pre-cut sheets. Double-walled sheet 20 is then fed via conveyor (not shown) to a hot compression machine 42. Hot compression machine 42 has hot compression bars 44 opposing a support 46 positioned on the underside of double-walled sheet 20. Hot compression machine 42 uses hot compression bars 44 to form transverse hinge lines 26 in double-walled sheet 20 in a manner described in more detail below with reference to FIG. 7.

Double-walled sheet 20 with transverse hinge lines 26 is then conveyed to die cutting and compression roller 48 and support roller 52. Cutting and compression protrusions 50 on die cutting and compression roller 48 contact double-wall sheet 20 to cut the sheet, providing the outer perimeter of container 10. Cutting and compression protrusions 50 also form parallel hinge lines 24 in double-walled sheet 20. The structure of die cutting and compression roller 48 is further described with reference to FIG. 8.

Double-walled sheet 20 with transverse hinge lines 26, parallel hinge lines 24, and cuts along the perimeter of container 10 is then conveyed to cut-off machine 54. Cut-off machine 54 has a cut-off blade 55 and a support 56 located beneath double-walled sheet 20. Cut-off machine 54 severs double-walled sheet 20 between adjacent container perimeters and the container blanks are then conveyed to a stamping machine 58.

Stamping machine 58 has stamping tools 59 and an opposing support 60 to support the container blank. Stamping machine 58 removes excess materials from the perimeter of the container blank. Subsequent processes (not shown) are provided to apply the hook components 28 and loop components 30 to the side panel flaps 16 and end panels 18, respectively, to form a finished container 10. Thereafter, material handling devices such as conveyors and robots (not shown) are used to handle containers 10 for stacking, storage and shipment.

Figure 7:
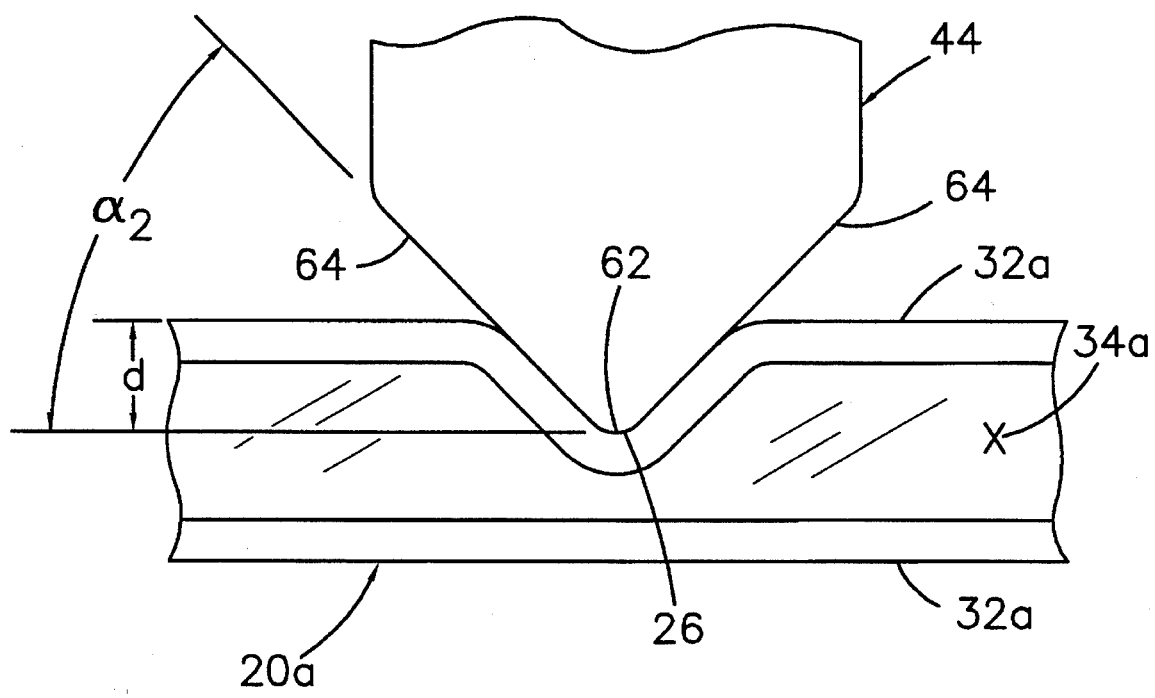
FIG. 7 is a side view of the detail of the apparatus as indicated in FIG. 6.

FIG. 7 shows hot compression bar 44 as it is applied to double-walled sheet 20a. Hot compression bar 44 has a rounded tip 62 terminating two inclined surfaces 64. Inclined surfaces 64 are preferably inclined at an angle $\alpha_2$ to opposing wall 32a of approximately 45°. Hot compression bar 44 compresses wall 32a of double-walled sheet 20a a distance d. Distance d is preferably controlled so that opposing walls 32a do not contact one another.

The webs 34a provide support for wall 32a as hot compression bar 44 is applied. Accordingly, webs 34a prevent disproportionate movement of wall 32a and act as a surrogate mold surface.

Optimal hinge-forming conditions are based on factors including hinge angle $\alpha$, hot compression bar temperature, thickness of wall 32a and sheet 20a, melt flow characteristics of the polymer, and the polymer's thermal characteristics.

Hot compression bar 44 is maintained at a temperature between the softening point of the polymer comprising plastic double-walled sheet 20a and the polymer's melting point. For example, the temperatures of hot compression bar 44 may be maintained, among others, in the ranges provided below for the following materials:

|  | Softening Point | Melting Point |
| --- | --- | --- |
| polyethylene | 120° C. | 132° C. |
| polypropylene | 150° C. | 165° C. |

If hot compression bar 44 is maintained at a temperature below the softening point, then double-walled sheet 20a will remain semi-crystalline and may retain its memory. In order to optimally form the hinge, the polymer's softening point is preferably reached to remove memory in the heat penetrated portions of the sheet, reform the sheet, and develop a new memory.

If, however, hot compression bar 44 is maintained at a temperature above the melting point of double-walled sheet 20a, then wall 32a may be melted. Although the integrity of the sheet's double-wall construction may be compromised if wall 32a is melted, a modified but acceptable hinge structure will result.

Because cooling rate impacts the degree of polymer crystallization, a cooling apparatus is optionally employed to promote fast cooling and prevent the formation of brittle hinges. A cooling apparatus, such as a water spray or air jets, could be added, for example, after die cutting and compression roller 48.

Figure 8:
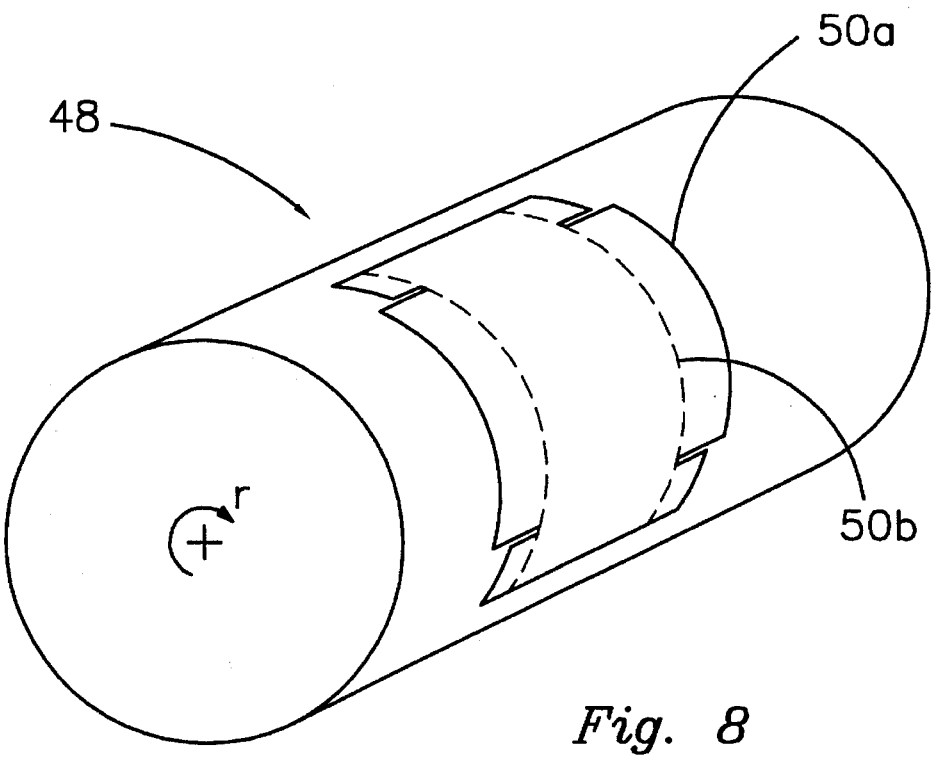
FIG. 8 is a perspective view of a portion of the apparatus shown in FIG. 6.

FIG. 8 better illustrates cutting and compression protrusions 50 on die cutting and compression roller 48. Cutting protrusions 50a (shown in solid lines) are oriented on die cutting and compression roller 48 in a manner corresponding to the outer perimeter edges of container 10 (FIG. 1). Cutting protrusions 50a cut double-walled sheet 20 so that a blank corresponding to each container 10 can easily be removed. Compression protrusions 50b (shown in broken lines) are oriented to form parallel hinge lines 24 which run parallel to webs 22 in double-walled sheet 20. Parallel hinge lines 24 are formed without the use of heat, and compression protrusions 50b merely collapse opposing walls of double-walled sheet 20 without materially altering the crystallinity of the polymer to provide a hinge about which container panels can flex.

Die cutting and compression roller 48 is continuously rotated in direction r shown in FIG. 8 to continuously cut and compress double-walled sheet 20 as it is conveyed through the apparatus shown in FIG. 6.

Die cutting and compression roller 48 illustrated in FIG. 8 is only shown with one container form. Die cutting and compression roller 48 may optionally have two or more forms positioned circumferentially on its surface and may also have two or more forms in side-by-side arrangement along the roller's surface. Placing numerous container forms on die cutting and compression roller 48 provides the apparatus shown in FIG. 6 with increased container output and efficiency.

If desired, many changes and modifications can be made to the illustrated embodiments of this invention without departing from its spirit and scope. For example, an additional machine may be added at the end of apparatus 39 shown in FIG. 6 for applying fasteners to the container panels. Such a machine could apply the hook and loop components of a velcro fastener, male and female snaps, tabs adapted for locking engagement with cut slits, or other fastener components. A handling machine may also be provided at the end of the apparatus shown in FIG. 6 to sort, stack and prepare finished containers for packaging and shipment. Such material handling machines could include automated robots, conveyors or other known material handling systems. Finally, a machine could be provided after cut-off machine 54 for flexing the container blank along the hot-formed hinges. Such a flexing machine could flex the panels upwardly before sheet 20 cools to increase the memory of the hot-formed hinges toward the upright position.

Furthermore, the structure of the apparatus shown in FIG. 6 and the order of the steps that the apparatus performs can be modified without departing from the scope of this invention. For example, the cutting and compression steps performed by die cutting and compression roller 48 could be performed in separate operations, and the cutting and compression operations performed by roller 48 can occur before transverse hinge lines 26 are formed by hot compression bars 44.

With respect to the container itself, the number and position of transverse and parallel hinge lines may be modified to form containers having a variety of configurations, depending on the manufacturer's preference and the end user's needs. For example, the container may have an integral lid or other features. Also, the double-walled web or corrugated construction can have walls of varying thicknesses, varying overall thicknesses and webs at any angle to the walls. The container can be formed with any desired overall dimensions, and any thermoplastic resin can be used.

Additionally, the shape of the hot compression bar may be modified depending on the desired hinge configuration. For example, the base of the hot compression bar can be semi-circular rather than pointed. Also, any number of hot compression bars can be used to form transverse hinge lines, depending upon the configuration of the container to be formed and the number of transverse hinge lines necessary to form the container.

The present invention, in any embodiment, provides an inexpensive, cost effective, high-quality collapsible container. The collapsible container is cyclable between a collapsed, flattened configuration for storage and shipment and an assembled configuration having high strength for stacking and handling.

What is claimed is:

1. A method for producing a collapsible container having panels interconnected by hinges, said method comprising the steps of:

(a) providing a hollow plastic sheet having substantially parallel opposing walls separated by a plurality of longitudinally extending webs communicating between said walls;

(b) forming transversely arranged hinges in said hollow plastic sheet by hot compressing at least one of the walls of said hollow plastic sheet along a line crossing at least a portion of said longitudinally extending webs;

(c) forming longitudinally extending hinges in said hollow plastic sheet by cold compressing at least one of the walls of said hollow plastic sheet along a line substantially parallel to said longitudinally extending webs;

(d) removing a container blank from said hollow plastic sheet corresponding to said transversely arranged hinges and said longitudinally extending hinges; and (e) finishing said container blank to form said container.

2. The method of claim 1 wherein the step of finishing said container blank includes trimming excess sheet from outside edges of said container blank.

3. The method of claim 2 wherein the step of finishing said container blank further includes applying one or more fasteners to the panels of said container.

4. The method of claim 1 wherein the step of removing a container blank includes cutting a container blank outline in said hollow plastic sheet and stamping said hollow plastic sheet to remove said container blank from said hollow plastic sheet.

5. The method of claim 1 wherein the step of providing a hollow plastic sheet includes extruding thermoplastic polymer to produce a profile having approximately right angles between said webs and said opposing walls.

6. The method of claim 1 wherein the step of providing a hollow plastic sheet includes laminating undulating thermoplastic polymeric sheet between two thermoplastic layers to form a corrugated structure wherein said undulating thermoplastic sheet provides said longitudinally extending webs.

7. The method of claim 1 wherein said step of forming said transversely arranged hinges includes heating a compression bar to a temperature no lower than a softening temperature of said hollow plastic sheet and no higher than a melting temperature of said hollow plastic sheet.

8. The method of claim 1 wherein said step of forming said transversely arranged hinges includes compressing one of the walls of said hollow plastic sheet until said wall is proximal to but not touching said opposing wall.

9. The method of claim 4 wherein said cutting is performed by passing said hollow plastic sheet between a forming roller and a solid roller.

10. The method of claim 1 wherein steps (c) and (d) are performed simultaneously as said hollow plastic sheet is passed between a forming roller and a solid roller.

* * * * *

UNITED STATES PATENT AND TRADEMARK OFFICE
CERTIFICATE OF CORRECTION

PATENT NO. : 5,501,758
DATED : March 26, 1996
INVENTOR(S) : Larry E. Nitardy

It is certified that error appears in the above-indentified patent and that said Letters Patent is hereby corrected as shown below:

In Column 2, line 61, please change "A--A" to --IV--IV--; and line 65, please change "B--B" to --V--V--.

In Column 3, line 4, after "FIG. 6." and before "FIG. 8", please insert new paragraph.

In Column 4, line 5, please change "A--A" to --IV--IV--.

Signed and Sealed this

Second Day of July, 1996

BRUCE LEHMAN

Attest:

Attesting Officer

Commissioner of Patents and Trademarks